3,254,419
GYROSCOPIC COMPASS SYSTEM
Charles E. Hurlburt, River Edge, N.J., assignor to The Bendix Corporation, Teterboro, N.J., a corporation of Delaware
Filed Oct. 31, 1962, Ser. No. 234,413
3 Claims. (Cl. 33—226)

This invention relates to improvements in a gyroscopic compass system and more particularly to a novel arrangement of a gyroscope structure so that a single gyroscope provides a double function of a gyroscope responsive to the rate of rotation of the earth and a north oriented directional gyroscope in which means are provided to obviate the rotational effects of the earth by an initial adjustment of the gyroscope for the local latitude position thereof relative to the earth and in which in its function as a rate gyroscope the spin axis of the gyroscope is adjustably positioned into parallel relation with the axis of rotation of the earth.

Heretofore a common gyroscope compass principle involved the use of a pendulous two degree of freedom gyroscope or equivalent combination of directional gyroscope and pendulum. A problem with this type of gyroscope compass has been the long stand-by time required for stabilization. Another common principle has involved the use of an extremely accurate rate gyroscope stabilized by a directional gyroscope. A further problem in such a directional gyroscope stabilized rate gyroscope has been that of adequately separating the effects of the vehicular rates of velocity from that of the effects of the rate of rotation of the earth at different latitudes.

A purpose of the present invention is to provide a gyroscopic instrument in which an extremely accurate rate gyroscope is so arranged as to determine true north with reasonable accuracy, when the vehicle, upon which the instrument is mounted, is stationary; and a further purpose is to provide an arrangement in which corrections for the earth's rates of rotation, as well as corrections for craft velocity, are not required, since a directional heading so determined as an axis for reorienting the rate gyroscope case as to obtain operation as an extremely low drift directional gyroscope is provided.

An object of the invention is to provide a north oriented gyroscope in which a single gyroscope structure of extremely low drift rate is utilized for a dual purpose. In this respect, a single gyroscope functions as an accurate rate gyroscope adjustably mounted in such a manner that the angle between the output axis of the rate gyroscope and a line extending vertical to the earth's surface is equal to the angle of the local latitude. In addition, a plane, which includes the spin axis and the output axis of the rate gyroscope is made vertical, and the gyroscope operating as a rate gyroscope is rotated about the vertical axis of the gimbal in response to an output signal from the rate gyroscope to a position at which the gyroscope spin axis extends parallel to the earth's axis. At this position, the three axes (rate gyroscope output axis, spin axis, and the earth's axis) all lie in a single plane and thereafter the gyroscope case is rotated exactly ninety degrees (90°) about the gyroscope spin axis so that there will be established an initial meridional position for the spin axis and for the input axis of the housing which is orthogonal to the output and spin axes which is now effective for operation as a type of directional gyroscope which will use the rate gyroscope output signal to maintain the angle between the spin axis and vertical at an angle equal to the complement of the latitude angle.

An object of the invention is to provide a directional gyroscope which requires no corrections for earth's rotation or craft velocity (except the maintenance of correct latitude setting for the N-S displacements). This is because the gyroscope spin axis and the axis of the earth are retained in parallel relation during the operation of the directional gyroscope.

Another object of the invention is to provide a gyroscope arrangement in which an accurate initial north orientation and initial setting of the gyroscope structure for the prevailing latitude provides a directional gyroscope with an extremely low drift in the subsequent mode of operation thereof so that a mission may be completed without intolerable error.

These and other objects and features of the invention are pointed out in the following description in terms of the embodiment thereof which is shown in the accompanying drawing. It is to be understood, however, that the drawing is for the purpose of illustration only and is not a definition of the limits of the invention, reference being had to the appended claims for this purpose.

In the drawings:
FIGURE 1 is a drawing illustrating the invention and including a perspective view of the gyroscope and schematic view of the control system therefor.

Figure 1:
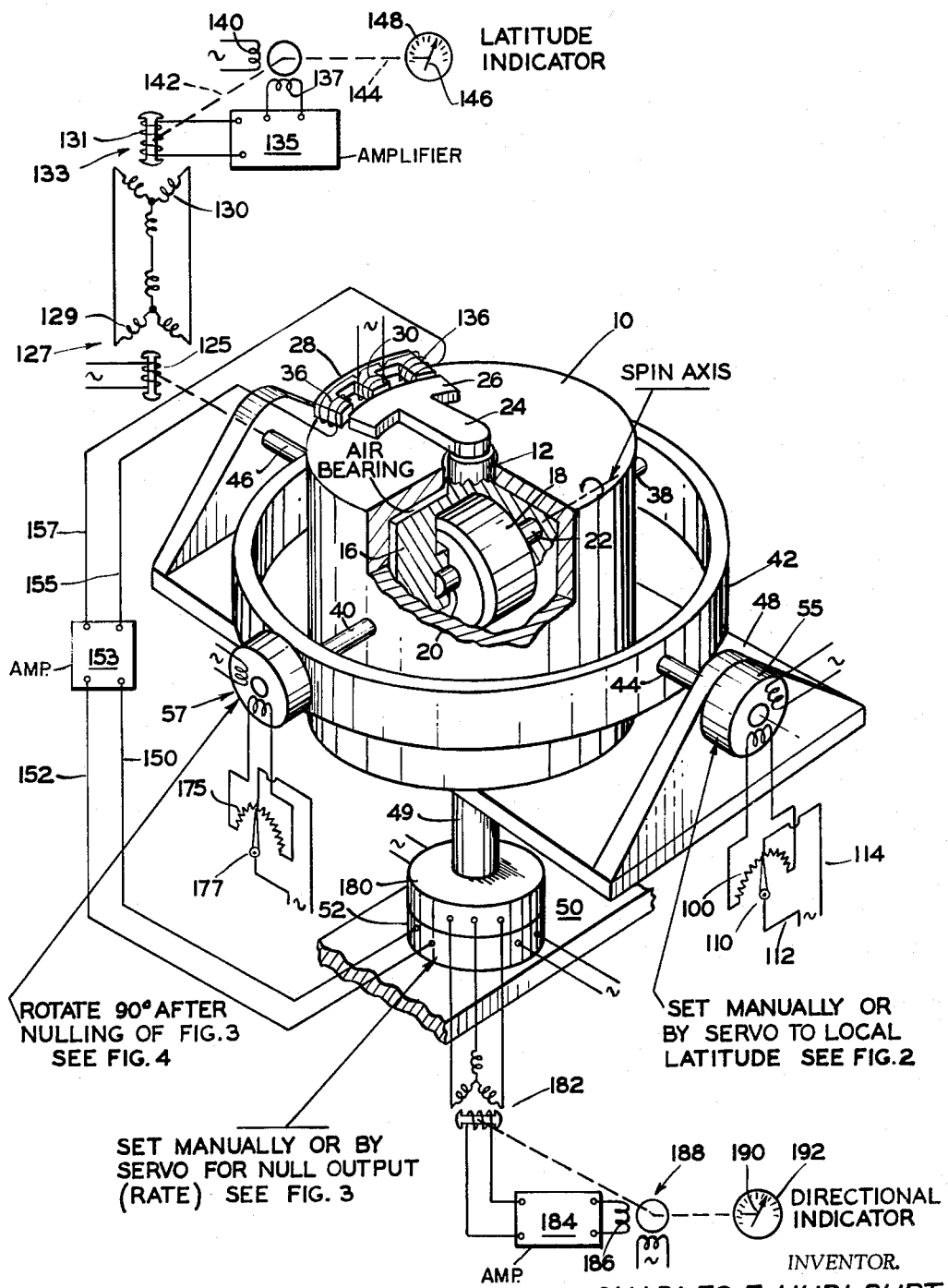

Referring to the drawing of FIGURE 1, there is indicated by the numeral 10 a gimbal or housing in which is rotatably mounted a rotor case 16 carried by suitable air bearing shafts, one of which is indicated by the numeral 12. The air bearing shafts 12 initially extend in alignment with the local vertical and may be adjustably positioned therefrom to effect the desired settings, as explained hereinafter and indicated diagrammatically in FIGURES 2, 3, and 4.

The rotor case 16 has rotatably mounted therein a rotor member 18 carried by bearings 20 and 22 which provide the spin axis of the gyroscope. The rotor 18 is driven by suitable motor means, not shown, and the shaft 12 has affixed at the outer end thereof a control arm 24 which carries an armture or vane 26 cooperating with a suitable E-shaped core 28 affixed to the housing 10. The E-shaped core 28 has a suitable primary winding 30 excited from a suitable source of alternating current and secondary or control windings 36 inductively coupled thereto through the E-shaped core 28 and armature 26.

The housing 10 is affixed to shafts 38 and 40 which are in turn pivotally mounted in and rotatably supported by a gimbal 42. The gimbal 42 is affixed to shafts 44 and 46 which are in turn rotatably mounted in and carried by supporting bracket 48. The bracket 48 is affixed to and supported by a vertical shaft 49 which is in turn rotatably mounted in a supporting member 50 which is fixed to the craft.

The shaft 49 may be angularly positioned either manually or by a suitable servomotor indicated by the numeral 52 and which may be of a conventional reversible two-phase type. The shafts 44 and 46 may also be rotatably adjustable either manually or by a suitable servomotor 55 carried by the bracket 48. The motor 55 may be of a conventional reversible two-phase type.

Further, the shafts 40 and 38 mounted in the gimbal 42 may be angularly adjustable by a suitable servomotor 57 mounted thereon so as to accurately adjust the housing 10 in relation to the gimbal 42. The servomotor 57 may also be of a conventional reversible two-phase type.

Figure 2:
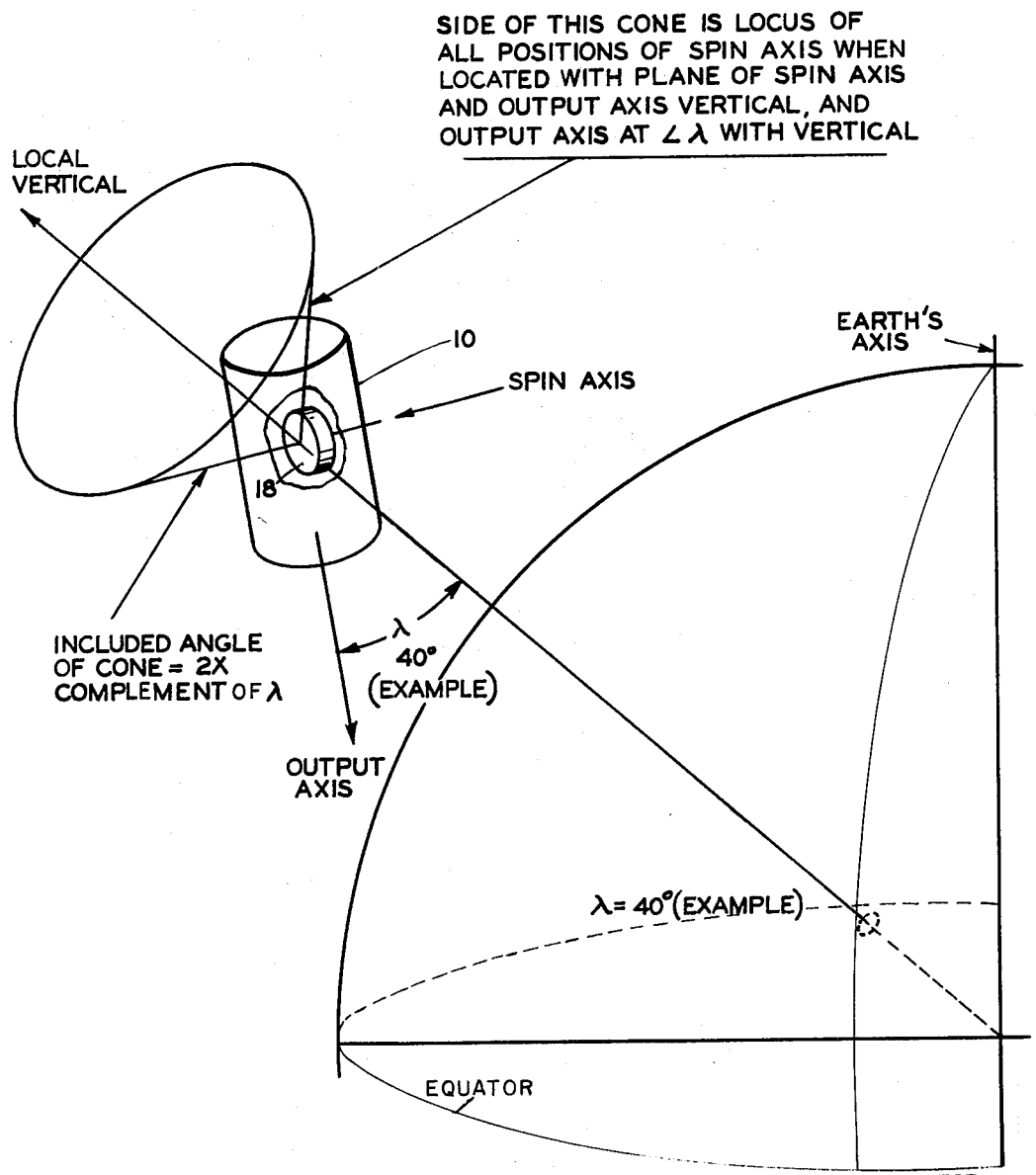
FIGURE 2 is a diagrammatic showing illustrating an initial adjustment of the gyroscope for the local latitude position thereof relative to the earth.

In the foregoing structural arrangement of FIGURE 1, it will be seen that the gimbal 42 may be angularly adjusted by operation of the servomotor 55 so that the normal axis of the gimbal 42, and thereby the shaft 12 of the rotor case 16 which extends initially in the local vertical position, will make an angle to the local vertical, as shown in FIGURE 2, which is the latitude for which the setting is desired, i.e. the angle which the plane of gimbal 42 makes to the horizontal is equal to such latitude. This angular adjusted position is shown diagrammatically in FIGURE 2.

In the drawing of FIGURE 1, there is shown a potentiometer 100 having an operator-operative control arm 110 whereby a suitable source of alternating current connected across the potentiometer 100 through lines 112 and 114 may be selectively applied to the control winding of the servomotor 55 so as to adjustably position the gimbal 42 to effect the desired angular setting. Such adjustment may be effected by the motor 55 or the desired angle of adjustment of the gimbal 42 may be effected by suitable manual control means or by other servomotor control means well known in the art.

In effecting the latter adjustment, the shaft 46, as shown in FIGURE 1, may be arranged so as to adjustably position a rotor winding 125 of a synchro 127 in which the rotor winding 125 is inductively coupled to suitable stator windings 129 of the synchro 127.

The stator windings 129 of the synchro 127 may be connected through suitable conductors to like stator windings 130 inductively coupled to a rotor winding 131 of a synchro 133. The stator winding 130 is in turn connected to an amplifier 135 and thereby to a control winding 137 of a suitable two-phase servomotor 140 which may adjustably position the rotor winding 131 through shaft 142 to return the same to a null position and through a shaft 144 to position an indicator pointer 146 for cooperation with suitable indicia 148 calibrated to indicate the latitude for which the gimbal 42 is adjustably positioned by operation of the servomotor 55. Of course, other suitable indicator means and servomotor control means may be provided or the shaft 46 may adjustably position directly a suitable indicator pointer in cooperative relation with suitable latitude indicia.

Figure 3:
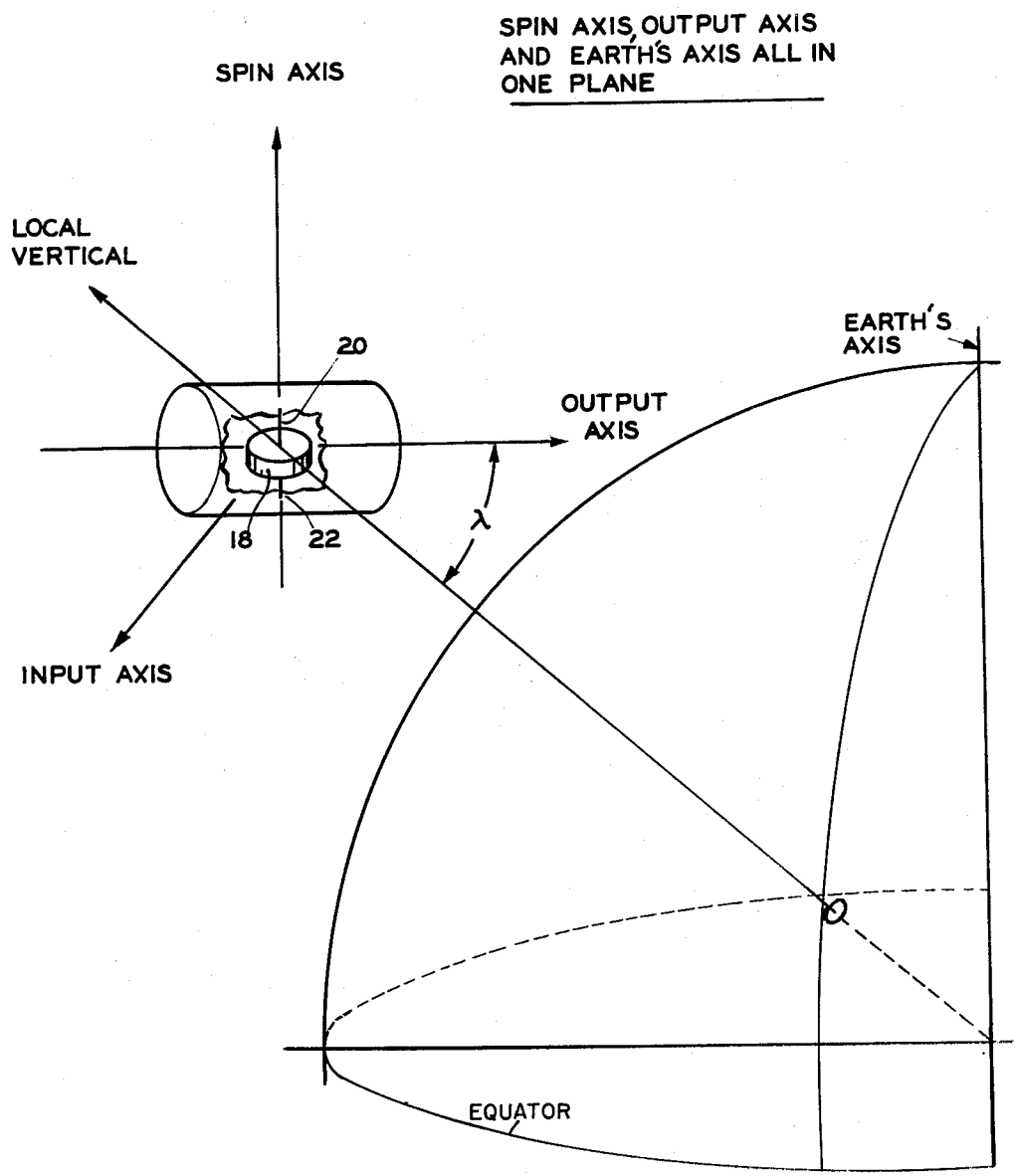
FIGURE 3 is a diagrammatic showing illustrating a further adjusted position of the gyroscope from that of FIGURE 2 in which the spin axis of the gyroscope is adjusted to a position parallel to the axis of rotation of the earth.

With the gimbal 42 adjusted for the local latitude, as shown diagrammatically in FIGURE 2, there is then effected a further angular adjustment of the bracket 48 such as to bring the spin axis 20-22 of the rotor 18 of the gyroscope into parallel relation with the earth's axis, as shown diagrammatically in FIGURE 3.

The foregoing setting may be effected by manual adjustment of the shaft 49 and angularly positioning the bracket 48, or this action, as shown in FIGURE 1, may be effected by operation of a servomotor 52 of a conventional two-phase type having a control winding connected through conductors 150 and 152 to the output of an amplifier 153. The amplifier 153 in turn has an input connected through electrical conductors 155 and 157 to the output of the control windings 36 of the E-shaped pick-off 28 mounted on the casing 10 and arranged in cooperative relation with the movable armature or vane 26 positioned by the control arm 24. The control arm 24 is affixed to the shaft 12 for angular adjustment thereby, as heretofore explained.

In the aforenoted arrangement, it will be seen that upon angular movement of the control arm 24 from a null signal position by the action of the gyroscope in response to the rotation of the earth upon the spin axis 20-22 of the gyroscope being out of parallel relation with the earth's axis, the resultant signal from the pick-off 28 will apply an electrical signal to the servo control motor 52 in a sense such as to effect angular adjustment of the shaft 49 and through the bracket 48 the spin axis 20-22 to a position in parallel relation with the earth's axis, whereupon the vane 26 will be re-centered so as to cause the output of the pick-off 26-28 to become null. Other suitable control means may be provided to effect the latter operation or such adjustment of the shaft 49 may be effected by a manual adjustment of the shaft 49 in a proper sense by the operator.

The foregoing adjustment of the spin axis 20-22 of the gyroscope then brings the same into parallel relation with the earth's axis, as shown diagrammatically in FIGURE 3. An additional adjustment of the casing 10 of the gyroscope is then effected by operation of a servomotor 57 which serves to adjust the casing 10 through the shaft 40 so as to angularly position the casing 10 ninety degrees (90°) about the spin axis 20-22 from the adjusted position, as shown diagrammatically in FIGURE 3, to the position shown diagrammatically in FIGURE 4.

As shown in the drawing of FIGURE 1, the shafts 38-40 are arranged in axial alignment with the spin axis 20-22 of the rotor 18.

The servomotor 57 for angularly adjusting the housing 10 to the desired ninety degree (90°) position may be controlled by the circuit shown in FIGURE 1, including a potentiometer 175 having an operator-operative control arm 177 and a suitable source of alternating current connected across the potentiometer so that upon adjustment of the arm 177 from a null position, there may be applied to the control winding of the servomotor 57 a signal causing angular adjustment of the casing 10 through the operation of shafts 38-40, as heretofore explained. The latter action may, of course, be effected manually by the operator positioning the shafts 38-40 and thereby the casing 10 to the desired position, or other suitable servomotor control means may be provided, as is well known in the art.

Figure 4:
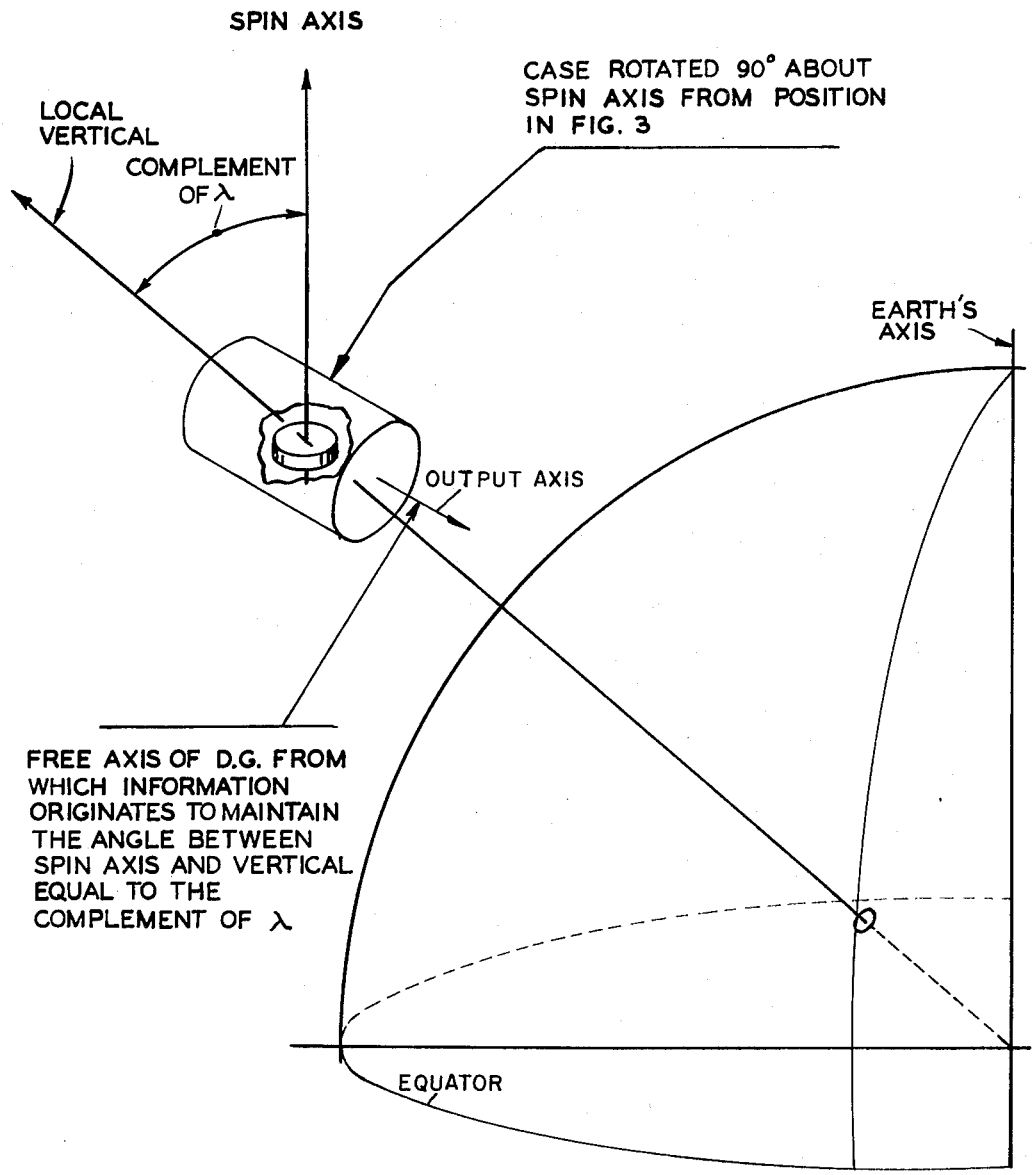
FIGURE 4 is a diagrammatic showing illustrating an additional adjusted position of the gyroscope from that of FIGURE 3 and in which the gyroscope case has been rotated ninety degrees (90°) about the spin axis from the position shown in FIGURE 3 and in which adjusted position of FIGURE 4 the gyroscope is operative as a directional gyroscope set for the prevailing latitude.

Upon the foregoing adjustment of the housing 10, it will be seen that the same will be adjusted from the position shown diagrammatically in FIGURE 3 to the position shown in FIGURE 4 in which there is established an initial meridional positon for the input and spin axes of the gyroscope which will now be effective for operation as a type of directional gyroscope.

In the latter operation, the gyroscope will adjustably position through the bracket 48 and shaft 49 affixed thereto a synchro 180 so as to apply an output signal to a second synchro 182, as shown in FIGURE 2, to apply through amplifier 184 a signal to control winding 186 of a suitable servomotor 188 controlling a pointer 190 cooperating with suitable indicia 192 to effect a directional indication.

Other suitable servomotor operated control means may be provided, as is well known in the art, to position a suitable indicator pointer or there may be affixed to the shaft 49 a suitable pointer cooperating with a card or other indicia bearing member for giving the required directional indication.

It will be further seen, as shown from the drawing of FIGURE 1, that the pick-off 26-28 is controlled by the adjusted position of the shaft 12. The pick-off 26-28 in response to the position of the spin axis 20-22 in relation to the axis of rotation of the earth will apply a signal upon the spin axis being azimuthally out of parallel relation with the axis of the earth's rotation. Such signal will control the servomotor control 52 and be in a sense such as to maintain the angle between the spin axis 20-22 and the vertical at an angle equal to the complement of the latitude angle.

The foregoing arrangement then will require no corrections for the rotation of the earth or for craft velocity (except for maintenance of correct latitude setting for N-S displacements). This is because the gyro spin axis 20-22, as shown diagrammatically in FIGURE 4, is maintained in parallel relation to the axis of rotation of the earth.

Moreover, with an accurate initial north orientation, obtained during the initial period of zero craft motion, and with the utilization of extremely low directional gyroscope drift in the subsequent mode of operation, missions may be completed without the development of intolerable errors.

The basic concept described with reference to the aforenoted mechanism is that of using a rate gyroscope to find North under favorable conditions and making no attempt to continually find North during unfavorable conditions, but rather to convert to a mode of operation (low drift directional gyroscopic operation) more tolerant of the unfavorable conditions where dependency upon the stability of the gyroscope in space is the means of completing a mission.

Although only one embodiment of the invention has been illustrated and described, various changes in the form and relative arrangement of the parts, which will now appear to those skilled in the art may be made without departing from the scope of the invention. Reference is, therefore, to be had to the appended claims for a definition of the limits of the invention.

What is claimed is:

1. A compass apparatus comprising a base subject to relative movement in space; motor means on said base and including a part adapted to be rotated about a first axis when said motor means is actuated; a gimbal, means pivotally mounting the gimbal on said rotatable part about a second axis extending perpendicular to the first axis; a housing, means pivotally mounting the housing on said gimbal about a third axis extending perpendicular to the first and second axes; a rotor casing, means pivotally mounting the casing in said housing about a fourth axis perpendicular to said third axis; a gyroscope rotor mounted in said casing and rotatably driven about a spin axis in axial alignment with the third axis, said fourth axis extending in a local vertical position; means for angularly adjusting said gimbal about said second axis so as to thereby angularly adjust the fourth axis relative to the local vertical position to set in the local latitude position of the compass apparatus relative to the earth, latitude indicator means operatively controlled by the angularly adjusted position of said gimbal about said second axis; means for positioning the spin axis of the gyroscope rotor into parallel relation to the axis of rotation of the earth including a signal generator means carried by said housing and adjustably positioned from a null signal position to a signal effecting position upon gyroscopic precession of the gyro rotor casing about said fourth axis in response to a deviation in the spin axis of the gyroscope rotor from the parallel relation to the axis of rotation of the earth, and circuit means connecting said signal generator means to said motor means operable for said motor means to be actuated upon said precession of said gyroscope rotor casing about said fourth axis to cause rotation to said rotatable part and said gyroscope rotor casing mounted thereon to a position about said first axis at which the spin axis of said gyroscope rotor is in parallel relation with the axis of rotation of the earth, whereby the signal generator means is adjustably positioned to a null signal position so that rotative movement imparted about said first axis to the rotatable part by said motor means is reduced to zero.

2. A compass apparatus comprising a base subject to rotative movement in space; motor means on said base and including a part adapted to be rotated about a first axis when said motor means is actuated; a gimbal, means pivotally mounting the gimbal on said rotatable part about a second axis extending perpendicular to the first axis; a housing, means pivotally mounting the housing on said gimbal about a third axis extending perpendicular to the first and second axes, a rotor casing, means pivotally mounting the casing in said housing about a fourth axis perpendicular to said third axis, a gyroscope rotor mounted in said casing and rotatably driven about a spin axis in axial alignment with the third axis, said fourth axis extending in a local vertical position, means for angularly adjusting said gimbal about said second axis so as to thereby angularly adjust the fourth axis relative to the local vertical position to set in the local latitude position of the compass apparatus relative to the earth, latitude indicator means operatively controlled by the angularly adjusted position of said gimbal about said second axis, means for positioning the spin axis of the gyroscope rotor into parallel relation to the axis of rotation of the earth including a signal generator means carried by said housing and adjustably positioned from a null signal position to a signal effecting position upon gyroscopic precession of the gyro rotor casing about said fourth axis in response to a deviation in the spin axis of the gyroscope rotor from the parallel relation to the axis of rotation of the earth, and circuit means connecting said signal generator means to said motor means operable for said motor means to be actuated upon said precession of said gyroscope rotor casing about said fourth axis to cause rotation of said rotatable part and said gyroscope rotor casing mounted thereon to a position about said first axis at which the spin axis of said gyroscope rotor is in parallel relation with the axis of rotation of the earth, whereby the signal generator means is adjustably positioned to a null signal position so that rotative movement imparted about said first axis to the rotatable part by said motor means is reduced to zero; and other means for angularly adjusting the housing about said third axis ninety degrees from the aforenoted latitude adjusted and null signal positions so as to establish an initial meridional position for the spin axis and the input axis of the gyroscope housing, and directional indicator means connected to said rotatable part operable for movement about said first axis in response to movement of the base in space relative to the heading thereof.

3. A compass apparatus comprising a base subject to rotative movement in space; first motor means on said base and including a part adapted to be rotated about a first axis when said first motor means is actuated; a gimbal, means pivotally mounting the gimbal on said rotatable part about a second axis extending perpendicular to the first axis; a housing, means pivotally mounting the housing on said gimbal about a third axis extending perpendicular to the first and second axes; a rotor casing, means pivotally mounting the casing in said housing about a fourth axis perpendicular to said third axis; a gyroscope rotor mounted in said casing and rotatably driven about a spin axis in axial alignment with the third axis; second motor means for angularly adjusting said gimbal about said second axis, first means for controlling said second motor means so as to angularly adjust the gimbal and thereby the fourth axis from an initial local vertical position so as to set in the local latitude position of the compass apparatus relative to the earth, latitude indicator means operatively controlled by the second motor means in accordance with the angularly adjusted position of said gimbal about said second axis; means for adjusting the spin axis of the gyroscope rotor into parallel relation to the axis of rotation of the earth including a signal generator means carried by said housing and adjustably positioned from a null signal position to a signal effecting position upon gyroscopic precession of the gyro rotor casing about said fourth axis in response to a deviation in the spin axis of the gyroscope rotor from a parallel relation to the axis of rotation of the earth, circuit means connecting said signal generator means to said first motor means operable for said first motor means to be effective to cause rotation of said rotatable part and said gyroscope casing mounted thereon to a position about said first axis whereat the spin axis of said gyroscope rotor is in parallel relation with the axis of rotation of the earth, whereby the signal generator means is adjustably positioned to a null signal position so that rotative movement imparted about said first axis to the rotatable part by said first motor means is reduced to zero; third motor means for angularly positioning the housing about said third axis, and second means for controlling said third motor means so as to adjustably position the housing ninety degrees from the last-mentioned adjusted position to establish an initial meridional position for the spin axis and the input axis of the gyroscope of the compass apparatus, and direction indicator means operatively connected to said rotatable part.

References Cited by the Examiner

UNITED STATES PATENTS

| | | | |
|---|---|---|---|
| 1,380,336 | 5/1921 | Paxton | 33—226 |
| 2,048,834 | 7/1936 | Young | 33—204.5 |
| 2,255,899 | 9/1941 | Ross | 33—226 |
| 2,953,858 | 9/1960 | Wrigley et al. | 33—226 |

FOREIGN PATENTS 247,265  2/1926  Great Britain.

ROBERT B. HULL, *Primary Examiner.*